2,845,398

COPOLYMER-WAX COMPOSITION

George L. Brown, Moorestown, N. J., and William R. Conn, Perkasie, Pa., assignors to Rohm & Haas Company, Philadelphia, Pa., a corporation of Delaware No Drawing. Application November 12, 1954
Serial No. 468,525

9 Claims. (Cl. 260—28.5)

The present invention is concerned with coating compositions for the production of bright coatings without polishing on surfaces of wood, linoleum, asphalt tile, concrete, and the like, especially on floors, counters, and furniture.

It is known to use emulsion polymerized polyvinyl acetate with or without wax as coating compositions for various purposes. However, the hardness of polyvinyl acetate generally was such that a plasticizer or coalescing agent was necessary when wax was used in the composition for producing a bright surface, unless the coating after application was heated. Such coatings have the disadvantage that they lose plasticizer by syneresis or evaporation. When low amounts of wax were used, there is a tendency of the polyvinyl acetate to re-emulsify whenever water is spilled on the surface with accompanying spotting effects. When substantial amounts of wax are present in the coatings made from compositions comprising polyvinyl acetate, they are difficult to remove unless there is added to the composition before the application of the coating an alkali-soluble resin or unless an excessive amount of wax is incorporated into the composition.

It is an object of the present invention to provide an improved coating composition adapted to produce a hard and tough high gloss coating that is resistant to spotting. Another object is to produce a coating composition adapted to produce coatings that can be readily removed on washing with alkaline soaps or dilute ammonia without the necessity of incorporating excessive amounts of wax or an additional alkali-soluble resin into the polyvinyl acetate/wax composition. Another object is to produce an improved composition in which the polyvinyl resin is an internally plasticized copolymer so that there is no need for the use of a separate plasticizer in the composition. Other objects and advantages of the invention will be apparent from the description thereof hereinafter.

In accordance with the present invention, there is provided an aqueous dispersion of a copolymer of 72% to 92% vinyl acetate, 5% to 25% methyl acrylate or ethyl acrylate, and 1% to 3% by weight of an acid of the group consisting of acrylic acid, methacrylic acid, itaconic acid, crotonic acid, or maleic acid, a wax and suitable dispersing agents. The relative proportions of the copolymer to wax is from 3:1 to 6:1 by weight and preferably is about 4:1. The amount of dispersing agent or agents is generally from 3% to 8% of the combined weights of the copolymer and wax. The concentration of the aqueous dispersion may be from 8% to 25% solids and is preferably about 10% to 15% by weight of solids. The dispersion must have a pH of at least about 7.5 and it may be as high as 9.5 or more. In no event is it allowed to be lower than 7.2. Suitable alkaline or buffering agents, such as borax, ammonia, or amines, may be introduced to adjust the pH to the desired value.

The copolymer is preferably made by the emulsion copolymerization of the several monomers in the proper proportions. Thus the monomers may be emulsified with an anionic or a non-ionic dispersing agent, about 1% to 6% thereof being used on the weight of total monomers. The acid monomer is, of course, soluble in water so that the dispersing agent serves to emulsify the other two monomers. A polymerization initiator of the free radical type, such as ammonium or potassium persulfate, may be used alone or in conjunction with an accelerator, such as potassium metabisulfite or sodium thiosulfate. The initiator and accelerator, commonly referred to as catalysts, may be used in proportions of ½ to 2% each based on the weight of monomers to be copolymerized. The temperature may be from room temperature to 60° C. or more as is conventional. Suitable anionic dispersing agents include the sodium salts of the higher fatty acid sulfates, such as that of lauryl alcohol, the higher fatty acid salts, such at the oleates or stearates, of morpholine, triethanolamine or mixed ethanolamines, or any of the non-ionic types, such as ethylene oxide modified alkyl phenols, of which tert-octyl phenol modified by 20 to 40 ethylene oxide units is representative, ethylene oxide modified higher fatty alcohols, such as lauryl alcohol, containing 20 to 50 ethylene oxide units, similarly modified long-chain mercaptans, fatty acids, amines, or the like. On the other hand, the copolymer may be produced by emulsion copolymerization and after proper dilution may be mixed with another emulsion or dispersion of the wax.

When the wax is separately dispersed, the dispersing agents mentioned above may similarly be used, but amine salts of soap, such as an ethanolamine oleate or stearate, are most useful. Suitable homogenizing mills may be used for assisting the dispersion.

An important characteristic of the copolymer obtained by emulsion polymerization is the fact that the average paritcle size in the dispersion of the copolymer that is obtained is quite small, being less than 0.1 micron. The particles of wax are similarly of small colloidal size. Possibly the sub-optical size contributes to the high gloss obtained in the final coating even though organic solvents are not used in the compostition to facilitate coalescence. The methyl or ethyl acrylate component of the copolymer imparts toughness to it and apparently contributes to the compatibility and blending of the wax and copolymer in the final film. The preferred proportions are 20 to 25 parts of acrylic ester to 80 to 75 parts of vinyl acetate. The carboxylic groups obtained from the copolymerized acid improves the stability of the emulsion and imparts removability by means of soaps and dilute ammonia solutions in water. It is quite important that the proportion of acid in the copolymer does not exceed 3% since more than that amount tends to cause spotting when water is spilled on coatings obtained from the compositions. Apparently the presence of the wax offsets any tendency of the copolymer to re-emulsify when not over 3% acid groups are present in the copolymer.

The waxes or mixtures of waxes which may be used include waxes of a vegetable, animal, synthetic, and/or mineral origin, or mixtures thereof, such as carnauba, candelilla, montan, lanoline, cocoa butter, cottonseed stearin, Japan wax, bayberry, myrtle, mace, palm kernel, beeswax, spermaceti, Chinese insect, mutton tallow, waxes obtained by the hydrogenation of coconut oils, soybean and perhaps of more importance, the mineral waxes such as paraffin, ceresin, montan, ozokerite, etc. Hard natural waxes, such as carnauba and montan waxes, are preferred.

The properties of the coated films obtained from the composition may be further modified by the replacement of up to 50% by weight of the wax with wax-soluble resins or gums either natural or synthetic such as terpene-phenolic resins, heat-processed ("run") Congo, wood rosin, oxidized petroleum wax and so forth.

The mixed emulsion has good storage stability under normal conditions of temperature. It may be applied in the usual manner by means of wiping cloths, by brushing, or by means of mops. It dries rapidly to clear, substantially colorless films having hard and tough glossy surfaces. There is substantially no discoloration of the films on ageing. They are readily removed with soapy solutions or dilute aqueous ammonia whenever it is necessary, either because of accumulation of dirt or because of the need to paint or varnish the base surfaces, for such removal.

The following examples are illustrative of the invention:

*Example 1*

Seventy-four parts by weight of vinyl acetate, 24 parts by weight of methyl acrylate, and 2 parts by weight of acrylic acid were emulsified in 250 parts by weight of water by means of 3 parts by weight of a tert-octyl phenol modified with an average of 30 ethylene oxide units. Copolymerization was effected in the presence of ½ part by weight of potassium persulfate and ½ part by weight of potassium metabisulfite to produce a copolymer dispersion.

Ten parts by weight of carnauba wax was melted and then introduced into 86 parts by weight of water at 95° C. which also contained 1.3 parts by weight of oleic acid, 1.7 parts by weight of triethanolamine and 1 part by weight of borax. The wax was emulsified by vigorous stirring and allowed to cool. After diluting the copolymer dispersion to a concentration of 12% solids, 80 parts by weight of the copolymer dispersion was added to 20 parts by weight of the wax dispersion.

The resulting coating composition was quite stable on storing and, when wiped on linoleum, rapidly hardened to a tough glossy surface. The coated surface showed no tendency to spot when water was spilled upon it but could be removed with moderate rubbing when dilute ammonia was applied.

*Example 2*

A copolymer dispersion was produced as in Example 1 from a mixture of 88 parts by weight of vinyl acetate, 9 parts by weight of methyl acrylate, and 3 parts by weight of acrylic acid.

A wax dispersion was produced as in Example 1 except that 5 parts by weight of the carnauba wax was replaced by 5 parts by weight of a terpene-phenolic resin. One hundred parts by weight of the copolymer dispersion diluted to a concentration of 12% was mixed with 20 parts by weight of the wax dispersion. The resulting copolymer/wax dispersion was applied with a mop to a varnished wood surface. The resulting coating dried to a hard, tough, glossy coating which needed no polishing. It showed no spotting with water but was readily removed with an ordinary soap solution.

*Example 3*

A copolymer dispersion was produced as in Example 1 from a mixture of 77 parts by weight of vinyl acetate, 21 parts by weight of ethyl acrylate, and 2 parts by weight of acrylic acid. A wax dispersion was prepared as in Example 1 except that 3 parts by weight of the carnauba wax was replaced with 3 parts by weight of a terpene-phenolic resin. Seventy-five parts by weight of the copolymer dispersion after dilution to a solids content of 12% was mixed with 25 parts by weight of the wax dispersion. Varnished floors and linoleum were coated with the resulting copolymer/wax dispersion and hard glossy coatings were obtained. The coating showed no spotting but was readily removed with dilute ammonia.

*Example 4*

A copolymer dispersion was produced as in Example 1 from a mixture of 75 parts by weight of vinyl acetate, 24 parts by weight of methyl acrylate, and 1 part by weight of itaconic acid. A wax dispersion was produced as in Example 1 in which the carnauba wax was entirely replaced by 8 parts of montan wax and 2 parts by weight of "run" Congo. One hundred twenty parts by weight of the copolymer dispersion after dilution to the concentration of 12% solids was mixed with 20 parts by weight of the wax dispersion. The resulting mixture was applied to linoleum surfaces and dried rapidly to a tough high gloss coating. The coating was readily removable with soap solutions.

It is to be understood that changes and variations may be made without departing from the spirit and scope of the invention as defined in the appended claims.

We claim:

1. A coating composition comprising an aqueous dispersion of (a) a copolymer of 72 to 92% vinyl acetate, 5 to 25% of an ester of acrylic acid with a member of the group consisting of methanol and ethanol, and 1 to 3% of an acid of the group consisting of acrylic acid, methacrylic acid, itaconic acid, crotonic acid and maleic acid, (b) a wax, and (c) an emulsifying agent, the ratio of copolymer to wax being from 3:1 to 6:1 and the dispersion having a pH of at least about 7.5.

2. A coating composition comprising an aqueous dispersion of (a) a copolymer of about 75 parts by weight of vinyl acetate, about 25 parts by weight of methyl acrylate, and about 2 parts by weight of acrylic acid, (b) a wax, and (c) an emulsifying agent, the ratio of copolymer to wax being from 3:1 to 6:1 and the dispersion having a pH of at least about 7.5.

3. A coating composition comprising an aqueous dispersion of (a) a copolymer of about 75 parts by weight of vinyl acetate, about 25 parts by weight of ethyl acrylate, and about 2 parts by weight of acrylic acid, (b) a wax, and (c) an emulsifying agent, the ratio of copolymer to wax being from 3:1 to 6:1 and the dispersion having a pH of at least about 7.5.

4. A coating composition comprising an aqueous dispersion of (a) a copolymer of about 75 parts by weight of vinyl acetate, about 25 parts by weight of methyl acrylate, and about 2 parts by weight of methacrylic acid, (b) a wax, and (c) an emulsifying agent, the ratio of copolymer to wax being from 3:1 to 6:1 and the dispersion having a pH of at least about 7.5.

5. A coating composition comprising an aqueous dispersion of (a) a copolymer of about 75 parts by weight of vinyl acetate, about 25 parts by weight of ethyl acrylate, and about 2 parts by weight of methacrylic acid, (b) a wax, and (c) an emulsifying agent, the ratio of copolymer to wax being from 3:1 to 6:1 and the dispersion having a pH of at least about 7.5.

6. A coating composition comprising an aqueous dispersion of (a) a copolymer of about 75 parts by weight of vinyl acetate, about 25 parts by weight of methyl acrylate, and about 2 parts by weight of itaconic acid, (b) a wax, and (c) an emulsifying agent, the ratio of copolymer to wax being from 3:1 to 6:1 and the dispersion having a pH of at least about 7.5.

7. A coating composition comprising an aqueous dispersion of (a) a copolymer of about 75 parts by weight of vinyl acetate, about 25 parts by weight of methyl acrylate, and about 2 parts by weight of acrylic acid, (b) carnauba wax, and (c) an emulsifying agent, the ratio of copolymer to wax being from 3:1 to 6:1 and the dispersion having a pH of at least about 7:5.

8. A coating composition comprising an aqueous dispersion of (a) a copolymer of 72 to 92% vinyl acetate, 5 to 25% of an ester of acrylic acid with a member of the group consisting of methanol and ethanol, and 1 to 3% of an acid of the group consisting of acrylic acid, methacrylic acid, itaconic acid, crotonic acid and maleic acid, (b) a wax, and (c) an emulsifying agent comprising a higher fatty acid salt of an amine of the group consisting of morpholine and ethanolamines.

9. A composition as defined in claim 8 in which the emulsifying agent also comprises a non-ionic dispersing agent.

References Cited in the file of this patent

UNITED STATES PATENTS 2,606,165 Chapin et al. _____ Aug. 5, 1952
2,695,277 Pabst et al. _____ Nov. 23, 1954